Dec. 15, 1970 HIDEO AKIYAMA ET AL 3,547,534
MICRO-IMAGE VIEWER-PRINTER APPARATUS
Filed Feb. 26, 1968
2 Sheets-Sheet 1
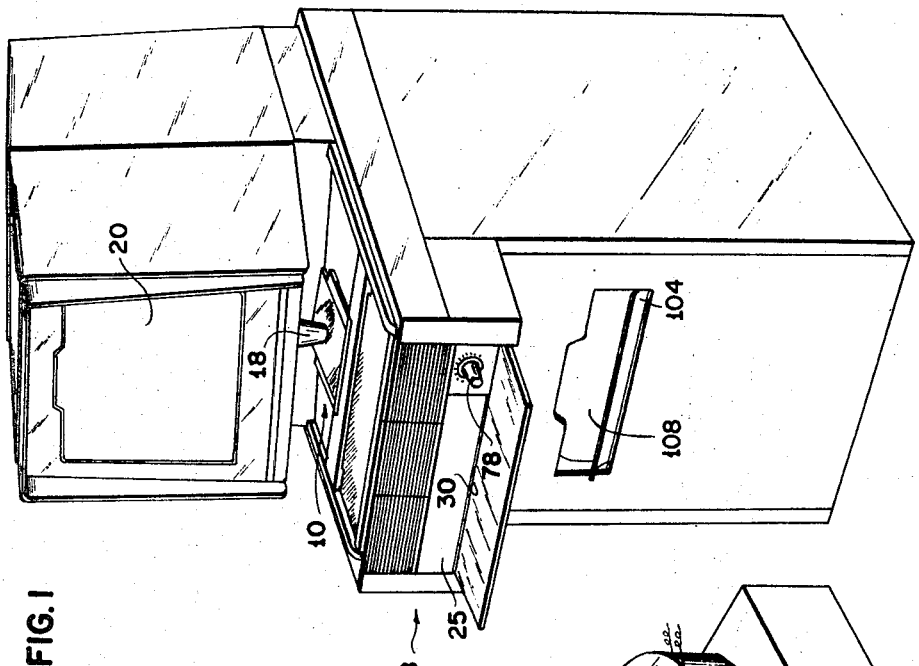
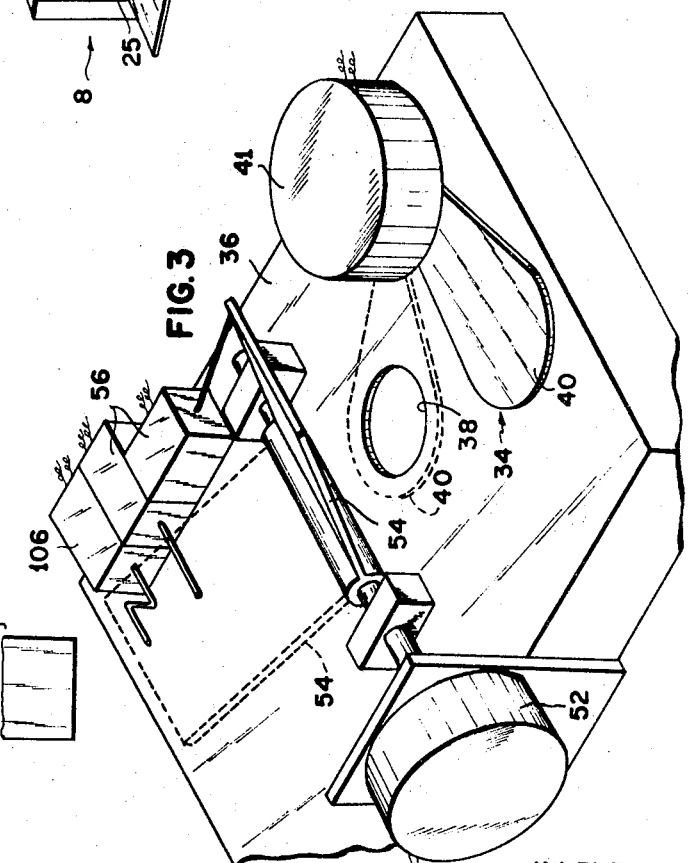
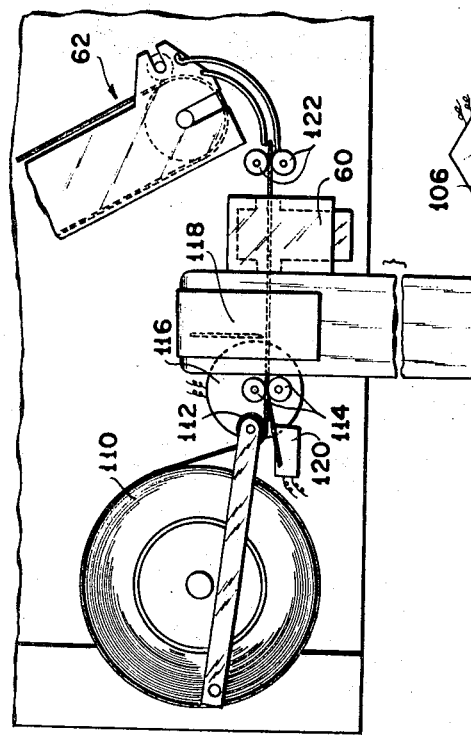
INVENTORS
HIDEO AKIYAMA
MAURICE H. ARTAUD
BY *John J. Matlago*
*Robert L. Harrington*
THEIR ATTORNEYS

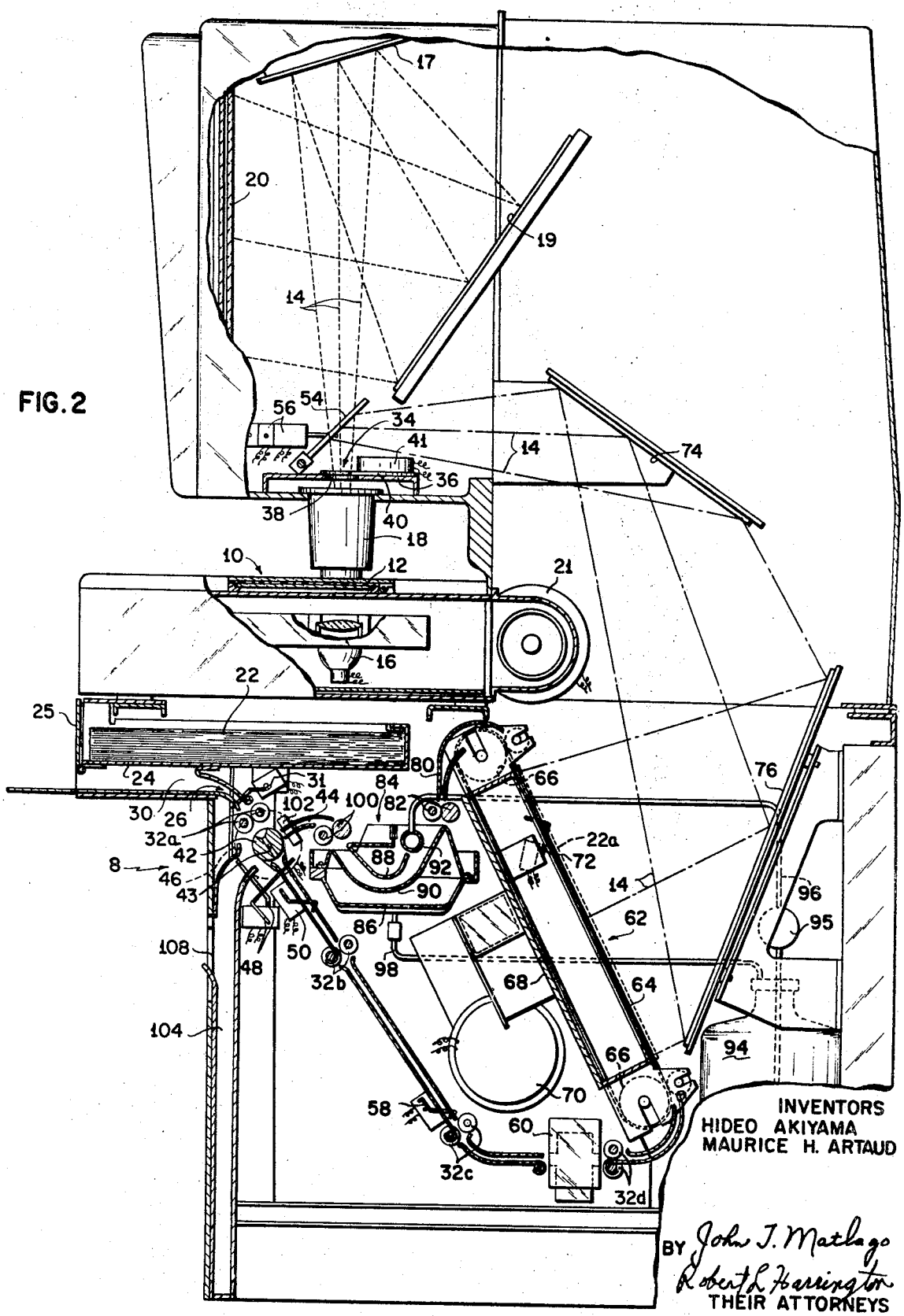

United States Patent Office 3,547,534
Patented Dec. 15, 1970

3,547,534
MICRO-IMAGE VIEWER-PRINTER APPARATUS
Hideo Akiyama, Los Angeles, and Maurice H. Artaud, Torrance, Calif., assignors to The National Cash Register Company, Dayton, Ohio, a corporation of Maryland
Filed Feb. 26, 1968, Ser. No. 708,409
Int. Cl. G03b 27/70
U.S. Cl. 355—5                                                                                                6 Claims

ABSTRACT OF THE DISCLOSURE

A combination viewer-printer having a primary light projection system for projecting a light beam through a micro-image bearing film and displaying a selected micro-image thereof on a display screen sufficiently enlarged for viewing. A secondary light projection system, on a selective basis, intercepts the image-bearing light beam and projects it onto an electrostatically charged sheet positioned on an exposure plenum, where an enlarged latent image of the micro-image is formed. The sheet is then passed through an electrostatic developing unit wherein ink particles are attracted to the charged image areas to form a hard copy print of the image.

BACKGROUND OF INVENTION

This invention relates to an apparatus having a combination of features that provides for selective viewing and selective printing of micro-images provided on a transparency.

It has become increasingly common to keep records, etc., which involves the massive accumulation of documents, on micro-image film for the purpose of conserving filing space. However, means must be provided whereby such records can be retrieved. Thus, for example, where images are reduced in the order of 150 to 1, a suitable viewer is desirable whereby the micro-images can be magnified substantially back to their original size, to enable visual identification of the information on the recorded documents. A viewer suitable for such retrieval is disclosed in the commonly assigned U.S. Pat. application filed in the names of Hideo Akiyama et al., Ser. No. 554,001, now Pat. No. 3,424,524 filed on May 31, 1966.

In the Akiyama apparatus, a film strip or the like is placed in the path of a projection light beam and the image is enlarged and projected onto a display screen. Although such visual retrieval of a document may be all that is required in many instances, in many other instances, there is a need to make a readable print of the document, e.g., where the information in the document is needed on hand for a given length of time, or where the document is to be distributed, etc.

It is accordingly an object of the present invention to provide means whereby a hard copy print, sufficiently enlarged for reading, can be made of the document. The present invention provides an apparatus which has the double capabilities of viewing a selected micro-image of a transparency for visual retrieval and, when desired, of producing suitable hard copy prints of the information represented on the micro-image. In general, a preferred embodiment of the present invention comprises a viewing system for visual retrieval of a micro-image which includes means for positioning a transparency that contains a plurality of micro-images, e.g., of documents reduced in the order of 150 to 1, a light source and a primary light projection system that projects a light beam through a selected micro-image of the transparency and then projects the image-bearing light beam onto a display screen with the image substantially enlarged back to its original size for viewing capability. A cooperating printing system includes a secondary light projection system having a mirror which, upon a selective basis, is positioned in the path of the image-bearing light beam to project the light through a combination of mirrors and onto an exposure plenum. Said printing system is designed to receive a specially coated sheet, the basic composition of whcih is well known to the art, that has the capability of becoming electrostatically charged. The sheet is passed through an electrostatic charging unit that produces an electrostatic charge on the coating of the sheet, and the sheet is then positioned on the exposure plenum. A light shutter blocks the light beam until the sheet is properly positioned, whereupon the shutter is opened and the sheet is exposed to the image-bearing light beam for an appropriate exposure interval. An enlarged latent image of the micro-image is formed on the sheet by reason of the light exposure neutralizing the electrostatic charge in the background areas. When the shutter is closed, the sheet is automatically passed into an electrostatic developing unit. A developing solution in the developing unit contains ink particles that are attracted to the charged image areas only. The sheet is then passed through a heat curing station where the ink is securely bonded to the sheet to thereby produce a permanent hard copy print of the micro-image.

It is believed that the present invention is novel in respect to the manner, generally described above, whereby a micro-image can be viewed on a display screen and at the selection of the operator, hard copy prints of the micro-image can be made. Such a system is very generally disclosed in a commonly assigned U.S. Pat. application Ser. No. 663,681, now Pat. No. 3,442,254 previously filed on Aug. 28, 1967 by the present inventors and entitled "Electrostatic Developer." The features of the invention will be more fully appreciated by reference to the following detailed description and drawings wherein:

FIG. 1 is a perspective view of a micro-image reader-printer apparatus in accordance with the present invention;

FIG. 2 is a cross-sectioned view of the reader-printer apparatus shown in FIG. 1;

FIG. 3 is an enlarged perspective view illustrating the elements that provide for the deflection and time controlled exposure of the image-bearing light beam in the printing operation; and FIG. 4 is an alternate type of mechanism for feeding coated sheets through the printing operation.

In the specific embodiment of the invention to be described herein, a "micro-image" may, for example, be an image of about .057" x .076" having a resolution of typically 500 lines per millimeter, which is to be displayed at a magnification of typically 150 to 1, or greater. The term "transparency" refers to a thin flexible transparent film having a large plurality of micro-images recorded thereon. The transparency may typically comprise a 0.15-inch thick, 4" x 6" rectangular cellulose film having over 3,000 micro-images recorded thereon in a row-column arrangement.

Referring to FIGS. 1 and 2 of the drawings the components making up the viewing system of the apparatus are contained in the upper section of the apparatus housing 8. A holder mechanism 10 mounted to the housing 8 is adapted for holding and positioning a transparency 12 within the path of a light beam 14 projected from a light source 16. The light beam is projected through a selected micro-image of the transparency. A projection lens assembly 18 then projects the image-bearing light beam toward a first reflecting mirror 17 which directs the light beam onto a second reflecting mirror 19 which directs the light beam onto a display screen 20. Heat from the light source 16 may be ventilated to the atmosphere as by a squirrel cage fan 21. The components making up the above projection system for projecting the image onto the display screen are hereafter sometimes referred to collectively as a primary light projection system. A more precise description of the various components of the viewing system can be found in the previously mentioned U.S. application of Akiyama et al. Ser. No. 554,001.

Referring now to the printing system for the apparatus, it will be understood that an operator may position various of the micro-images contained on the transparency within the light beam for visual retrieval and have no need for producing hard copy prints thereof. When a hard copy print of a micro-image displayed on the display screen is desired, the operation for producing the print, and the various components making up the sequence of events of the operation are as follows:

A coated sheet 22 is withdrawn from a stack of sheets contained in a storage tray 24 that is provided in the housing 8 of the apparatus. Basically, the composition of the sheet includes a coating comprised of a photoconductive zinc oxide suspended in an electrically insulating film-forming binder, which coating is coated on a paper substrate. A suitable sheet composition is available from numerous sources well known in the electrostatic printing art, and is more specifically described in the Greig U.S. Pats. Nos. 3,052,539 and 3,052,540, both of which were issued on Sept. 4, 1962, and assigned to Radio Corporation of America.

The storage tray 24 is light proof (note the cover 25 covering the front of the storage tray which must be opened to remove the sheet 22) to prevent premature exposure of the coating on the sheet. Also, the sheets are preferably stacked with the coated side down so that a sheet can be withdrawn from the storage tray and inserted into the apparatus with a minimum of exposure to ambient light.

The sheet 22 is inserted, with the coated side down, into a receiving channel 30 that forms the mouth of a guideway 26. A switch 31 at the entrance to the guideway 26 is engaged by the sheet 22 and has the following functions: The switch 31 starts a drive means (not shown) that rotates the guideway rollers 32a–d. The switch 31 also activates a shutter 34 to block the light beams 14. The shutter 34 is illustrated in FIGS. 2 and 3 and as shown is comprised of a bracket 36 that is mounted to the apparatus housing 8. The bracket is positioned in the path of the light beam 14 at a point after the light beam has passed through the transparency 12 and the projection lens assembly 18. An opening 38 in the bracket 36 is aligned with the light beam pathway and a shutter blade 40 is mounted for pivotal movement to close the opening 38. A rotary solenoid 41 controls the pivotal movement to move the shutter blade 40 over the opening 38 in response to the engagement of the switch 31 by the sheet 22. The switch 31 also activates a reversible motor 52 that pivots a mirror 54 to an operational position. As shown in FIG. 3, stopping switches 56 are connected to the reversible motor 52 and are adapted to be engaged by the mirror 54 when moved between an operational position (solid lines) and a nonoperational position (dotted lines) for stopping the mirror in the desired positions.

The sheet 22 is manually inserted until it is engaged by the first set of guideway rollers 32a. The sheet is then automatically directed through a crossover guide bar 42. The guide bar 42 is adapted for rotatable movement whereby in a first position, as shown, the guide slot 43 is aligned with the guideway 26 and, in a second position, the guide slot 43 is aligned with an exit guide 44. A reversible motor 46 controls the pivotal movement of the guide bar between the first and second positions. Stopping switches 48 are engaged when the guide bar is pivoted from one position to the other. The switches are connected to the reversible motor 46 to provide for precise positioning of the guide bar 42 and insure alignment of the guide slot 43 with the guideway 26 and exit guide 44 in each of the respective positions.

The sheet 22, after passing through the guide slot 43 of the crossover guide bar 42, engages a switch 50. This switch starts a timer (not shown) which turns off all the motors of the printing system after allowing time for the sheet 22 to pass through the printing system, e.g., if the equipment operates on a 28 second cycle, the timer is set for 28 seconds. The switch 50 also activates a vaccum blower 70 and a heating unit 102, the functions of which are described later.

The sheet 22, after passing the switch 50, is engaged by the second set of guideway rollers 32b and guided down the guideway where it engages a switch 58. This switch activates the reversible motor 46 for the guide bar 42 to position the guide slot into alignment with the exit guide 44. The sheet 22 is engaged by the third set of guideway rollers 32c and passed through a corona discharge unit 60. A suitable discharge unit is described in the Giaimo U.S. Pat. No. 2,922,883 issued on Jan. 26, 1960, and assigned to Radio Corporation of America.

An electrostatic charge is formed on the coating of the sheet 22 by the corona discharge unit 60 and the sheet is then engaged by the fourth set of guideway rollers 32d for directing the sheet 22 onto an exposure plenum 62. The exposure plenum 62 is comprised of an endless belt 64 mounted for rotation about rollers 66 which are driven by a drive means (not shown) that is initially activated by the switch 31 when engaged by sheet 22 in the first step of the printing operation. A shroud 68 covering the back of the belt 64 is connected to a vacuum pump 70. The belt 64 consists of three strips so that a vacuum can be drawn through the belt. Thus as the sheet 22 is directed onto the rotating belt 64, the vacuum draws the sheet tightly against the belt which effectively grips the sheet and moves it over the front of the exposure plenum 62.

A switch 72 (mounted to the shroud between the belt strips) is engaged by the sheet when the sheet is in the desired position for exposure (see FIG. 2 where a positioned sheet 22a is shown in dotted lines). The switch 72 shuts off the drive mechanism for rollers 66 to stop the belt 64, and also activates the rotary solenoid 41 which pivots the shutter blade 40 to pass the light beam 14. The light beam is reflected by the mirror 54 toward a mirror 74 mounted to the apparatus housing 8, which reflects the light beam toward mirror 76, also mounted to the housing 8, which reflects the light beam onto the sheet 22 positioned in the exposure plenum 62. An adjustable timer 78 mounted on the front of the housing 8 (see FIG. 1) is connected to the rotary solenoid 41 for closing the shutter after allowing for the desired exposure time. When the shutter is closed the drive means for the rollers 66 is reactivated and the exposed sheet is passed to a guide 80 which guides the sheet to driven rollers 82 which pass the sheet into the electrostatic developing unit 84. As the sheet moves off the exposure plenum, switch 72 is released. This activates the reversible motor 52 to return the mirror 54 to its nonoperational position (shown in dotted lines in FIG. 3). When reaching this nonoperational position switch 106 is engaged which opens the shutter 34. This permits a projection of the image onto the display screen 20 during the development stage of the printing operation. Because the required rate of speed for developing the image may be different from the rate of speed for applying the electrostatic charge onto the sheet, the drive means for the rollers 66 may have two driving speeds so that the belt can pick up the sheet at the rate at which it is moving through the guideway 26 and then have a second speed that is activated by the timer 78 which passes the sheet to the electrostatic developing unit 84.

The electrostatic developer unit 84 may be any of a number of types. For example, one suitable type is described in the Ostensen U.S. Pat. No. 3,249,088 issued May 3, 1966, and assigned to SCM Corporation. Another type is disclosed in the commonly assigned U.S. patent application Ser. No. 663,681 filed on Aug. 28, 1967 in the names of the present inventors.

The electrostatic developer illustrated in FIG. 2 comprises a basin 86 with an upper guide member 88 and lower guide member 90 forming a concave curved pathway for the sheet 22. A tubular fountain 92 is mounted over the basin 86 near the start of the curved pathway. A developing solution is contained in a storage bottle 94 and a pump 95 (shown in dotted lines) pumps the developing solution out of the bottle 94 through tube 96 to the fountain 92. As the sheet passes into the curved pathway and under the fountain, the developing solution is sprayed onto it. A shallow pool of the solution forms at the bottom of the curved pathway and the sheet is briefly immersed in the solution as it is guided through the developer unit 84 by the driven ingress rollers 82. The solution passes through the lower guide member 90 and is funnelled by the basin 86 to a return tube 98 which returns the solution to the storage bottle.

The latent image that is formed on the coated sheet 22 when exposed to the image bearing light beam 14 consists of electrostatically charged image areas contrasting with the noncharged background areas. The charge in the background areas was neutralized when those areas were light exposed on the exposure plenum. The areas corresponding to the image areas of the light beam are blocked from light and remain charged. When the sheet is passed through the developing solution, ink particles contained thereon are attracted to and settle on the charged areas but will not settle on the uncharged areas. Thus when the sheet comes out of the developing solution a print of the image is clearly visible.

Egress rollers 100 then engage the sheet and pass it through the exit guide 44 which guides the sheet through a heating unit 102. The heating unit 102 produces a heat curing effect that securely bonds the ink to the sheet while driving off any of the solvent of the solution remaining on the sheet. The sheet is then passed through the guide slot of the crossover guide bar 42 and into a receiving tray 104. The cycle being completed, the timer activated by switch 50 activates the reversible motor 46 to reposition the guide bar 42 so that the guide slot 43 therein is again aligned with guideway 26, and then shuts off all the motors in the printing system. A ready light on the panel indicates that the cycle is complete and another sheet of paper 22 can then be inserted. An opening 108 in the front of the receiving tray allows for easy removal of the sheet 22 which contains the desired print of the selected micro-image.

It will be understood that numerous variations may be made in the illustrated apparatus without departing from the scope of the invention. Thus in FIG. 4, a modification is illustrated whereby instead of inserting individual sheets into the apparatus, the sheets are contained in a continuous roll 110. The leading end of the roll 110 is passed under a tightener 112 and engaged by drive rollers 114. In response to a signal, e.g., as obtained by a manually operated button, drive motor 116 is activated to drive the drive rollers 114 which feed the sheet through a cutter 118. A control switch 120 gauges the proper length of the sheet, stops the drive motor 116, and activates the cutter 118. Drive rollers 122 engage the cut sheet and the sheet is passed through the corona discharge unit 60 and onto the exposure plenum 62. The remainder of the operation is similar to that described above.

It will be understood that various other omissions, substitutions and changes in the form and details of the apparatus illustrated, and in their operation, may be made by those skilled in the art without departing from the scope and spirit of the invention. It is the intention, therefore, to be limited only as indicated by the following claims.

What is claimed is:

1. A micro-image viewer-printer apparatus comprising: a viewing system including a light source, a display screen, and a primary light projection system for projecting a light beam from said light source through a micro-image bearing transparency and onto the display screen for displaying an enlarged image of a selected micro-image of the transparency; a printing system for producing a hardcopy print of the displayed micro-image which includes an exposure plenum adapted to receive an electrostatically charged sheet, a secondary light projection system including means to intercept the image-bearing light beam and project it toward the electrostatically charged sheet to form an enlarged latent image of the micro-image thereon, a shutter positioned in the path of the light beam and shutter control means to control the exposure time of the sheet, and an electrostatic developing unit positioned to receive the exposed sheet for developing the latent image thereon; said means for intercepting the image bearing light beam comprising a mirror that is mounted for movement between an operative position with the mirror located in the path of the light beam to reflect the light beam toward the exposure plenum, and an inoperative position with the mirror removed from the path of the light beam, and positioning means for positioning the mirror between its operative and inoperative positions; means to automatically direct the sheet through the stages of the printing system and sensing means for detecting when the sheet is properly positioned on the exposure plenum, said means for automatically directing the sheet being responsive to said sensing means for stopping the sheet at the proper position for exposure; said shutter control means being responsive to the sensing means for opening the shutter and thereby exposing the sheet to the image bearing light beam and including a timer that determines the proper exposure time and then closes the shutter; said means for automatically directing the sheet through the printing system being activated when the timer closes the shutter for directing the sheet from the exposure plenum to the electrostatic developing unit, said sensing means detecting the removal of the sheet from the exposure plenum, said positioning means for the mirror being responsive to the sensing means upon detection of the sheet being removed from the exposure plenum to position the mirror in its inoperative position, and said shutter control means being responsive to said positioning of the mirror for opening the shutter to permit projection of the light beam on the display screen during the remaining stages of the printing operation.

2. A micro-image viewer-printer as defined in claim 1 wherein the means for automatically directing a sheet into position on the exposure plenum comprises an endless belt mounted on a pair of rollers with means for driving the belt around the rollers, the exposure plenum being defined by the length of belt located between the rollers, vacuum means for drawing a vacuum through openings provided in the belt whereby a sheet contacting the belt will be drawn to the belt and be carried with the belt along the exposure plenum.

3. A micro-image viewer-printer as defined in claim 2 wherein said printing system includes an electrostatic charging unit for producing an electrostatic charge on the sheet before the sheet is positioned on the exposure plenum.

4. A micro-image viewer-printer apparatus adapted for convenient visual retrieval and selective printing of a micro-image provided on a transparency, said apparatus comprising a housing with upper and lower sections adapted for housing a micro-image viewing system in the upper section and a micro-image hard copy printing system in the lower section; said viewing system including a light source, a rear view display screen positioned for viewing from the front of the housing, and a primary light projection system for projecting a light beam from the light source onto the back of the display screen, and a holder mechanism mounted to the housing to hold a transparency having micro-images thereon and to position a selective micro-image of the transparency in the path of the light beam for projection of the image onto the display screen; said printing system including an electrostatic charging unit, a rearwardly facing exposure plenum, an electrostatic developing unit, a guideway for receiving and guiding a sheet between the charging unit, exposure plenum and developing unit respectively; and a secondary light system including a movable mirror for intercepting and rearwardly projecting the image-bearing light beam, and a reflecting means for reflecting the intercepted light beam onto the rearwardly facing exposure plenum; wherein driven guideway rollers are associated with the guideway to move the sheet along the guideway, said exposure plenum is provided by an endless belt mounted on driven rollers, and a vacuum means is associated with the endless belt to draw the sheet tightly against the belt for movement of the sheet along the exposure plenum, and sensing means for detecting the proper position of the sheet for exposure, said driven endless belt being responsive to the sensing means to stop the sheet at said proper position for exposure; a shutter for blocking the image bearing light beam, guideway sensing means for sensing a sheet being inserted into the guideway, said shutter being responsive to the guideway sensing means to block the light beam, and said movable mirror being responsive to the guideway sensing means for movement into its light intercepting position, said shutter being further responsive to the sensing means for detecting the proper position of the sheet on the exposure plenum to permit exposure of the sheet to the image bearing light beam, and a timer for closing the shutter upon proper exposure and for reactivating the driven endless belt.

5. A micro-image viewer-printer apparatus adapted for convenient visual retrieval and selective printing of a micro-image provided on a transparency as defined in claim 4 wherein, said guideway has a receiving channel for receiving individual sheets located in a convenient manner in the front of the apparatus near the top of the lower section thereof, said guideway adapted to direct the sheet to the lower end of the exposure plenum, and an exit guide for directing the sheet from the electrostatic developing unit located adjacent the upper end of the exposure plenum across the guideway and into a receiving tray located in a convenient manner in the front of the apparatus below the receiving channel, and a rotatable crossover bar having a single guide slot, and a guide bar positioning means for aligning the guide slot of the guide bar with the guideway while a sheet is directed through the guideway, and for aligning the guide slot with the exit guide while the sheet is being directed from the electrostatic developing unit to the receiving tray.

6. A micro-image viewer-printer apparatus adapted for convenient visual retrieval and selective printing of a micro-image provided on a transparency as defined in claim 4 wherein the sheets are provided from a continuous sheeting provided on a roll, said printing system includes a sheet cutter, a feeding mechanism to feed the continuous sheeting into the sheet cutter, and control means for gauging the length of the sheeting and for stopping the feeding mechanism and for activating the cutter to cut the sheeting into the proper sized sheets, and said guideway being located for receiving the sheets as they are cut from said sheeting.

References Cited
UNITED STATES PATENTS

| | | | |
|---|---|---|---|
| 3,183,768 | 5/1965 | Rosenburgh et al. | 355—45 |
| 3,282,177 | 11/1966 | Stanton | 355—10 |
| 3,385,161 | 5/1968 | Sage et al. | 355—5 |
| 3,416,860 | 12/1968 | Mihoveuich et al. | 355—10 |
| 3,424,524 | 1/1969 | Akiyama et al. | 353—22 |

JOHN M. HORAN, Primary Examiner

M. HARRIS, Assistant Examiner

U.S. Cl. X.R.

355—10, 45, 67

UNITED STATES PATENT OFFICE
CERTIFICATE OF CORRECTION

Patent No. 3,547,534        Dated December 15, 1970

Inventor(s) Hideo Akiyama et al.

It is certified that error appears in the above-identified patent and that said Letters Patent are hereby corrected as shown below:

Column 2, line 57, "0.15-inch" should read -- .015 inch --

Signed and sealed this 4th day of May 1971.

(SEAL)
Attest:

EDWARD M. FLETCHER, JR.
Attesting Officer

WILLIAM E. SCHUYLER,
Commissioner of Paten